United States Patent

Parker et al.

[11] Patent Number: 5,593,786
[45] Date of Patent: Jan. 14, 1997

[54] SELF-ADHERING POLYVINYL CHLORIDE SAFETY GLASS INTERLAYER

[75] Inventors: Anthony A. Parker; David A. Strickler; Stephen P. Bartus, Jr., all of Toledo; Susan M. Wolke, Ottawa, all of Ohio

[73] Assignee: Libbey-Owens-Ford Company, Toledo, Ohio

[21] Appl. No.: 336,477

[22] Filed: Nov. 9, 1994

[51] Int. Cl.$^6$ ..................................................... B32B 17/06
[52] U.S. Cl. ........................... 428/426; 428/429; 428/441; 428/442; 428/515; 428/518; 156/106; 156/306.6
[58] Field of Search ................................... 525/239, 932; 428/426, 429, 430, 435, 436, 441, 442, 451, 500, 515, 518, 520, 522, 410, 212, 213, 214, 215, 909, 911, 913, 920; 156/106, 306.6

[56] References Cited

U.S. PATENT DOCUMENTS

| | | |
|---|---|---|
| 3,762,988 | 10/1973 | Clock et al. |
| 3,952,135 | 4/1976 | Priddle et al. ........................... 428/442 |
| 4,277,538 | 7/1981 | Beckmann et al. |
| 4,303,739 | 12/1981 | Beckmann et al. ..................... 428/429 |
| 4,600,627 | 7/1986 | Honda et al. |
| 4,865,918 | 9/1989 | Tanuma et al. ......................... 428/409 |
| 4,910,074 | 3/1990 | Fukawa et al. ......................... 428/215 |
| 4,945,002 | 7/1990 | Tanuma et al. ......................... 428/425.6 |
| 5,190,825 | 3/1993 | Arribart et al. ......................... 428/412 |
| 5,352,528 | 10/1994 | L'Her et al. ............................ 428/426 |
| 5,372,887 | 12/1994 | Segawa et al. ......................... 428/409 |

FOREIGN PATENT DOCUMENTS 0569299  11/1993  European Pat. Off.

Primary Examiner—William A. Krynski
Attorney, Agent, or Firm—Marshall & Melhorn

[57] ABSTRACT

Laminated safety glass includes a pair of glass sheets bonded together with a self-adhering composite interlayer. The composite interlayer is formed of a support layer including a plasticized PVC containing film and a polymeric adhesive layer on one, or preferably both, of the major surfaces of the support layer. The adhesive layers are formed of a polymeric material which is capable of adhering to the PVC containing support layer and to the glass sheets. The respective refractive indices of the adhesive layers and the support layer are matched as closely as possible in order to eliminate optical distortion caused by interfacial reflections of incident light. A preferred copolymer resin for forming the adhesive layers is poly(vinyl chloride-co-vinyl acetate-co-maleic acid).

30 Claims, 1 Drawing Sheet

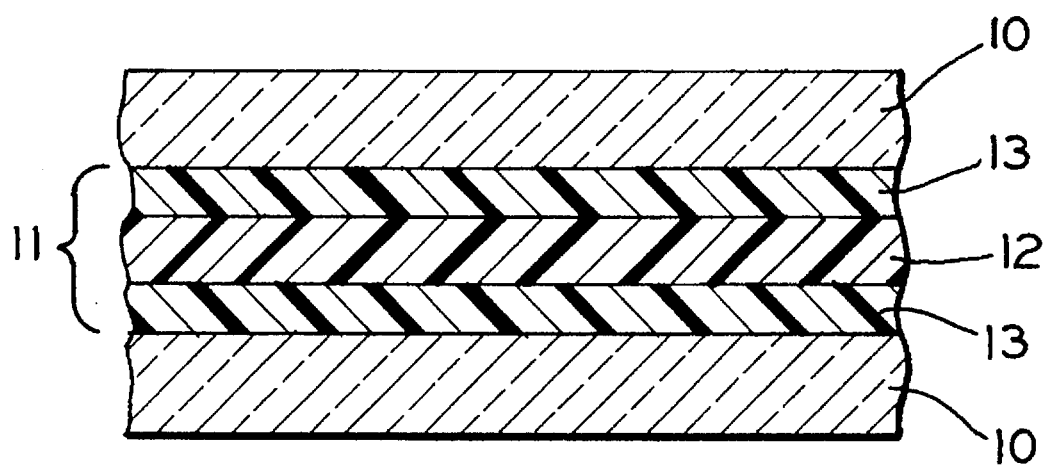

SELF-ADHERING POLYVINYL CHLORIDE SAFETY GLASS INTERLAYER

BACKGROUND OF THE INVENTION

1. Field of the Invention

The present invention relates to an interlayer for safety glass and, more particularly, to a self-adhering, composite interlayer including a polyvinyl chloride to containing layer.

2. Summary of Related Art

Safety glass is a well known term for a glass sandwich composed of an interlayer bonding together two glass plates or sheets so that breaking the glass results in minimum dispersion of broken glass fragments. The interlayer must possess a number of properties, including the following: high impact energy adsorption to minimize concussive injury; shear and tear strength sufficient to prevent rupture of the interlayer by the broken glass; sufficient adhesion to the glass to inhibit laceration on contact with, and prevent dispersion of, broken glass; acceptable thermal heat stability and weatherability; and good optical quality. The interlayer must possess these properties over the wide range of temperatures in which these laminated glazings are used.

It has been widely known to use a film of plasticized polyvinyl butyral as the interlayer material in safety glass for automobiles, air planes and building materials because of its high adhesiveness, transparency and good mechanical properties over a broad range of temperatures. However, the use of plasticized polyvinyl butyral films makes the production of laminated safety glass relatively expensive.

The surface of plasticized polyvinyl butyral film is very tacky, and presents a problem of blocking at the time of windup after film formation. Thus, plasticized polyvinyl butyral film must be provided with some parting means if it is to be stored or transported in the form of stacks of die-cut blanks or in the form of rolls. Furthermore, the production of plasticized polyvinyl butyral films requires specialized equipment and, due to their sensitivity to moisture, plasticized polyvinyl butyral films must generally be handled under controlled atmosphere conditions during manufacture, storage and immediately prior to their incorporation into the laminated safety glass. This all adds to the expense of utilizing plasticized polyvinyl butyral films in laminated safety glass.

Alternative interlayer materials have been proposed. For instance, U.S. Pat. No. 4,277,538 to Beckmann et al discloses a laminated safety glass employing a sheet of plasticized polyvinyl chloride (PVC) as the interlayer. The use of PVC would be advantageous in that it may be produced on conventional equipment and would be much less expensive to manufacture and process into a laminated safety glass when compared with polyvinyl butyral. However, by itself, a PVC film will not adhere to glass. To increase the adhesion of the PVC to glass, Beckmann et al suggest the use of an organofunctional silane, either as a primer or uniformly dispersed within the PVC film.

However, neither use of a silane adhesion promoter is without drawbacks. Dispersing an organofunctional silane within the PVC film in quantities sufficient to provide adequate adhesion to glass has been found to result in a laminate having a haze which is unacceptably high for many applications. In addition, dispersing the silane in the interlayer may have a negative effect on the processability of the interlayer material. Secondly, the application of an organofunctional silane adhesion promoter as a primer necessitates an additional lamination manufacturing step, increasing the manufacturing costs of the resulting laminated glazing unit.

U.S. Pat. No. 4,600,627 discloses a laminated glazing unit including a pair of glass sheets and a composite interlayer. The interlayer is formed of an interleaving sheet formed from polyester or PVC sandwiched between two intermediate layers of a crosslinking polymer, such as ethylene/vinyl acetate (EVA). The intermediate layers, which provide an adhesive bond between the interleaving sheet and the two glass sheets, have a thickness of about 0.2 mm. It has been determined, however, that that intermediate layers of EVA will not provide sufficient adhesion to the glass, and that the use of silane adhesion promoters is therefore required. In addition, at least where the interleaving sheet is formed of PVC, the resulting laminating glazing exhibits poor optical quality.

Accordingly, it would be advantageous to provide an improved PVC containing interlayer which was relatively inexpensive and self-adhering to a glass sheet. It would further be advantageous to provide such a PVC containing interlayer which, when incorporated into a laminated glazing, provided good optical quality.

SUMMARY OF THE INVENTION

The present invention relates to an improved polyvinyl chloride containing interlayer for laminated safety glass. The laminated safety glass or glazing unit includes a pair of glass sheets bonded together with a self-adhering composite interlayer. The composite interlayer is formed of a support layer including a plasticized PVC containing film and a polymeric adhesive layer on one, or preferably both, of the major surfaces of the support layer. The adhesive layers are formed of a polymeric material which is capable of adhering to the PVC containing support layer and to the glass sheets.

In a preferred embodiment, the adhesive layers have a first refractive index and the support layer has a second refractive index which matches the first refractive index as closely as possible in order to eliminate optical distortion caused by interfacial reflections of incident light. To accomplish this, the first and second refractive indices should differ by no more than about 0.05. The adhesive layers are therefore preferably formed of a copolymer of vinyl chloride and at least one co-monomer capable of adhering to glass. A preferred copolymer resin for forming the adhesive layers is poly(vinyl chloride-co-vinyl acetate-co-maleic acid).

The adhesive layers may be sprayed as latex to form a film on the support layer or the glass sheets. Alternatively, the adhesive layer formulation may be placed into solution and roll coated or rotogravure printed as a thin film on the support layer. The adhesive layers may also be co-extruded in pelletized form with the support layer. Rotogravure printing is the preferred method of forming the adhesive layers. The thickness of the adhesive layers will be determined by the degree to which the refractive index of the adhesive layer is matched to that of the support layer, and by the desired level of adhesion. In accordance with the invention, the thickness each of the adhesive layers is preferably no more than 1 mil, and is more preferably no more than about 0.5 mils.

The improved PVC containing interlayer of this invention is thus relatively inexpensive and is self-adhering to a glass sheet. In addition, the interlayer, provides a laminated glazing having good optical quality.

Other objects and advantages will become more apparent during the course of the following description when taken in connection with the accompanying drawings.

BRIEF DESCRIPTION OF THE DRAWING

The drawing is a diagrammatic cross-sectional view of a laminated glazing unit in accordance with this invention.

DESCRIPTION OF THE PREFERRED EMBODIMENT

The numerous and varied properties required of an interlayer material for use in laminated safety glass has made it very difficult to successfully develop such laminated safety glass employing a PVC interlayer, even though the cost advantages of so doing are potentially substantial. As mentioned above, the properties an interlayer must possess include: high impact energy adsorption; shear and tear strength sufficient to prevent rupture of the interlayer by broken glass; sufficient adhesion to the glass to inhibit laceration on contact with, and prevent dispersion of, broken glass; acceptable thermal heat stability and weatherability; and good optical quality.

In accordance with the invention, a laminated safety glass or glazing unit is provided including a pair of glass sheets 10 bonded together with a self-adhering composite interlayer 11. The composite interlayer 11 is formed of a support layer 12 including a plasticized PVC containing film and a plastic adhesive layer 13 on one or both of the major surfaces of the support layer. Preferably, an adhesive layer 13 is provided on both sides of the support layer 12, as illustrated in the drawing Figure. As described below, use of the composite interlayer 11 results in a laminated glazing which exhibits all of the properties mentioned above and is less expensive to produce than a comparable laminated glazing employing polyvinyl butyral.

SUPPORT LAYER

The support layer 12 of the composite interlayer 11 is formed of a relatively high number average molecular weight vinyl chloride polymer. Thus, the support layer 12 includes a vinyl chloride homopolymer, copolymer or graft polymer, or blended combinations thereof. The thickness of the support layer 12 substantially affects the impact strength of the laminated glazing unit. The impact strength of the laminated glazing unit will decrease with a decrease in the thickness of the support layer 12, so a support layer 12 of at least about 25 mils or more is preferred. However, from a commercial standpoint, it is desirable to form the support layer so that the overall thickness and weight of the laminated glazing unit is comparable to current products, which utilize a PVB interlayer about 30 mils thick. Accordingly, the thickness of the support layer 12 is preferably between about 28 to 35 mils.

If the support layer 12 is formed of a polyvinyl chloride homopolymer, it preferably has a number average molecular weight, or a mixture of number average molecular weights, of at least 30,000. In a preferred embodiment, the number average molecular weight, or mixture of number average molecular weights, is between about 40,000 and about 165,000, with a degree of polymerization of about 500 to 2600. One such preferred PVC resin is SE-1300, having a degree of polymerization of 1300 and a number average molecular weight of 80,600, which is commercially available from Shintech Inc. of Houston, Tex.

Control of the molecular weight distribution and purity of the PVC has been found to be very important in a safety glass interlayer application. Variances in molecular weight distribution can have a profound effect on the impact properties and processability of the film. In addition, the presence of impurities, such as initiators, can lead to excessive degradation and yellowing of the interlayer and can have a detrimental effect on the long term heat stability of the interlayer. Accordingly, the PVC is preferably formed by suspension polymerization, which offers superior control of molecular weight and the removal of impurities.

It has also been found that a plasticized film containing a blend of a PVC homopolymer with copolymers, such as a copolymer between vinyl chloride and vinyl acetate, provides an improved support layer 12. Such a copolymer exhibited improved flow properties, and hence, when blended with the PVC homopolymer results in improved processability over the PVC homopolymer alone. The support layer 12 is composed of a blend of from about 75 to 98 phr PVC and from about 2 to 25 phr poly(vinyl chloride-co-vinyl acetate). In a preferred embodiment, the blend is about 95 parts PVC homopolymer and about 5 parts of the poly(vinyl chloride-co-vinyl acetate). Examples of suitable vinyl chloride/vinyl acetate copolymers are MPR-TSN, commercially available from Nissin Chemicals, Nitta-Gun, Japan, which is a copolymer of 87% vinyl chloride and 13% vinyl acetate with a degree of polymerization of 400; and UCAR VYHD, commercially available from Union Carbide, which is a copolymer of 86% vinyl chloride and 14% vinyl acetate with a degree of polymerization of 220.

In another preferred embodiment, the support layer 12 is formed of a blend of a PVC homopolymer and a copolymer of vinyl chloride and methylacrylate. An example of a suitable vinyl chloride/methylacrylate copolymer is Geon E8 commercially available from The Geon Company. In this embodiment, the support layer 12 is formed from about 40 to 80 parts PVC homopolymer with about 20 to 60 parts of the vinyl chloride/methylacrylate copolymer. This blend may also preferably include from about 5 to 15 parts of a polycaprolactone, such as CAPA 656, commercially available from Solvay Interox.

In a further preferred embodiment, the support layer 12 is formed of an ethylene/vinyl chloride copolymer. One suitable example thereof is VE-U resin, commercially available from Sekisui of Japan. This poly(vinyl chloride-co-ethylene) includes 8% ethylene comonomer and has a degree of polymerization of 1,050.

In a most preferred embodiment, the support layer 12 is formed of a copolymer of vinyl chloride or a mixture of vinyl chloride and one or more other vinyl monomers copolymerizable therewith, and an allyl ether prepared by the partial allylation of a polyhydric alcohol or a mixture of such allyl ethers, as described more fully in co-pending application Ser. No. 08/283,386 entitled "VINYL CHLORIDE COPOLYMERS AND METHOD OF PRODUCING THE SAME." The level of vinyl chloride is to be kept above 50% by weight of the total monomer mix. Examples of hydroxy containing monomers synthesized by the partial allylation of such polyhydric alcohols include trimethylolpropane diallyl ether, trimethylolpropane monoallyl ether, allyl sucrose, allyl pentaerythritol, glycerol monoallyl ether, glycerol diallyl ether, etc. The preferred hydroxy containing monomers are trimethylolpropane monoallyl ether and trimethylolpropane diallyl ether. The allyl ethers prepared by the partial allylation of a polyhydric alcohols are preferably used in accordance with the invention in the range of 0.015 to 30, and more preferably in the range of about 0.1 to 10, parts by weight per hundred parts by weight of the total monomer mixture.

The plasticizers for the preparation of the plasticized films containing PVC in accordance with the invention can be linear or branched aliphatic diesters, triesters or tetraesters, or aromatic diesters, triesters or tetraesters, or mixtures thereof. From a performance standpoint, preferred plasticizers include dihexyl azelate (DHZ), dihexyl adipate (DHA) and dioctyl azelate (DOZ). However, dioctyl adipate (DOA), while providing slightly reduced performance relative to the other noted plasticizers, may be most preferred in view of its combination of performance and relatively lower cost. In addition, plasticizer blends may be employed for both economic and performance considerations. For example, mixing butyl benzyl phthalate (BBP) or DOP with DHA will result in a higher glass transition temperature than with DHA alone at the same total plasticizer level. As a result, room temperature mean break height will improve without disrupting low temperature performance. The total plasticizer concentration is between about 20 about 60 phr, depending primarily upon the number average molecular weight and molecular weight distribution of the PVC containing resin. A total plasticizer concentration of between about 35 and about 45 phr is most preferred.

The PVC containing film is also preferably provided with between about 1 to 5, more preferably about 2 to 4 phr, of a primary heat stabilizer including an organometallic compound, such as salts of the alkaline metals and selected transition metals, including aluminum, barium, cadmium, calcium, lead, magnesium, tin, and zinc. The primary heat stabilizer preferably includes a mixture of a zinc salt of an organic acid and a barium, calcium or tin salt of an organic acid, or a mixture thereof. The primary heat stabilizer preferably includes from about 1.6 to 4.0% atomic zinc as a zinc salt of an organic acid, and from about 7.0 to 14.0% atomic barium as a barium salt of an organic acid. The zinc salt may be, for example, zinc stearate, zinc laurate, zinc oleate, zinc iso-stearate, zinc octoate, or zinc decanate, or mixtures thereof. Likewise, examples of suitable barium and calcium salts include barium or calcium stearate, laurate, oleate, isostearate, octoate, or decanate, nonylphenolate, or mixtures thereof.

To maximize the long term, service use temperature heat stability of a PVC film used as a safety glass interlayer, the primary heat stabilizer also preferably includes from about 2.0 to 4.0% phosphorus as phosphites. A preferred phosphite has been found to be triphenyl phosphite.

In addition to the primary heat stabilizer, the PVC containing film also preferably includes several secondary heat stabilizers, including epoxidized oils, perchlorates, and 1,3 [beta]-diketones. From about 2.5 to 15.0 phr of an epoxidized oil is preferably included as a secondary heat stabilizer in the PVC containing film. A preferred epoxidized oil is epoxidized soybean oil. The PVC film also preferably includes from about 0.1 to 1.0 phr of a perchlorate, a preferred perchlorate being sodium perchlorate. As another secondary heat stabilizer, the PVC film is provided with between about 0.1 and 2.0 phr of a 1,3 [beta]-diketone. A preferred 1,3 [beta]-diketone has been found to be stearyl benzoyl methane.

The support layer 12 may also include other additives, such as UV light stabilizers, antioxidants, optical brighteners, dyes and the like. Thus, the support layer 12 is preferably formed from a formulation including from about 0 to 2 phr of a benzophenone or benzotriazole derivative as a UV stabilizer, from about 0 to 5 phr hindered phenols as an antioxidant, from about 0 to 1 phr of a fluorescent or whitening agent, and from about 0 to 1 phr of a blue dye.

ADHESIVE LAYERS

The adhesive layers 13 of the interlayer 11 are formed of a polymeric material which adheres both to the support layer 12 and the glass sheets 10. If an adhesive layer 13 is provided on each of the surfaces of the support layer 12, the two adhesive layers 13 may be of the same or different formulations. For example, where the laminated glazing unit is to be mounted in a vehicle, it may be preferable to form the adhesive layers 13 with different formulations which provide differing levels of adhesion to the glass sheets 10. Thus, it may be preferable to formulate the adhesive layers 13 so that there is a higher level of adhesion between the support layer 12 and the glass sheet 10 which is inboard of the vehicle than between the support layer 12 and the glass sheet 10 which is outboard of the vehicle.

As noted above the adhesive layers 13 should adhere to the support layer 12 as well as to the glass sheets 10. To accomplish that, the adhesive layers 13 are formed of a polymeric material which is thermodynamically compatible with the vinyl chloride polymer of the support layer 12, and which includes at least one type of functional group which is capable of forming chemical bonds with glass, whether such bonds be covalent, ionic, hydrogen bonds, or other chemical bonds. The adhesive layers 13 are preferably formed of a copolymer having a functional group which is capable of adhering to the support layer. As used herein, the term "copolymer" means a polymer formed by the polymerization of two or more different types of monomer species. Examples of preferred polymers for forming the adhesive layers 13 include poly(ethylene-co-vinyl acetate-co-acrylic acid); poly(vinyl pyrrolidone-co-vinyl acetate); poly(vinyl chloride-co-vinyl acetate-co-vinyl alcohol); poly(vinyl chloride-co-acrylic ester); poly(vinyl chloride-co-vinyl acetate-co-maleic acid); poly(vinyl chloride-co-acrylic ester-co-maleic acid); and copolymers of vinyl chloride, vinyl acetate or acrylic ester, and the acid of an acrylic ester.

Since the support layer 12 is formed of a vinyl chloride homopolymer, copolymer, graft polymer, or a combination thereof, the vinyl chloride groups present in the above examples provide excellent adhesion to the support layer 12 through a mechanism of intermolecular chain entanglement as occurs with thermodynamically compatible polymers. The vinyl acetate groups and other groups that are compatible with vinyl chloride will also provide adhesion to the support layer 12. The acid functionality provided in the above noted examples by the maleic acid or acid of an acrylic ester is a preferred means of obtaining adhesion of the adhesive layer 13 to the glass sheets 10.

In a preferred embodiment, the formulation for the adhesive layers 13 may include a silane, preferably a silane that can react covalently with the polymer in the adhesive layers 13 to form a graft copolymer. It is believed that forming such a graft copolymer will prevent diffusion of the silane into the support layer 12 and thereby reducing the adhesion. Epoxy, mercapto, and amino silanes are preferred. If the adhesive layers 13 contain acid groups, an epoxy silane, such as gamma glycidoxypropyl trimethoxysilane, is preferred. The acid functional groups of the polymer may then be employed to react with epoxy, forming a graft copolymer with characteristic alkoxy silane groups, which can hydrolyze and in turn bond to the glass sheet 10. In this manner, excellent adhesion with low sensitivity to moisture is obtained between the adhesive layer 13 and the glass sheet 10, even when the adhesive layer 13 is deposited at a thickness of less than 0.1 mils on the surface of the support layer 12. Moreover, including a silane in the adhesive layers 13 has not resulted in significant haze in the laminated glazing.

The adhesive layers 13 preferably include a plasticizer comprising a linear or branched aliphatic diester, triester or tetraester, or aromatic diester, triester or tetraester, or mixtures thereof, the concentration of the plasticizer being between about 5 to about 60 phr.

The adhesive layers 13 are also preferably provided with between about 1 to 5, more preferably about 2 to 4 phr, of a heat stabilizer including an organometallic compound, such as salts of the alkaline metals and selected transition metals, including aluminum, barium, cadmium, calcium, lead, magnesium, tin, and zinc. For the adhesive layers 13, the heat stabilizer preferably includes a tin salt of an organic acid. The adhesive layers 13 may also contain other heat stabilizers, such as those noted above for the support layer 12.

The adhesive layers 13 may also include other additives, such as UV light stabilizers, antioxidants, optical brighteners, dyes, inorganic fillers, inorganic pigments and the like. The adhesive layers 13 of the invention are preferably formed from a formulation including up to about 10 phr of a benzophenone or benzotriazole derivative as a UV stabilizer. The adhesive layers 13 may also include up to about 5 phr hindered phenols as an antioxidant, up to about 1 phr of a fluorescent or whitening agent, and up to about 1 phr of a blue dye.

The adhesive layers 13 are preferably formed as thin films on the surfaces of either support layer 12 or the respective glass sheets 10. Each adhesive layer 13 is preferably about 0.01 to 0.5 mils thick. Within that range, a thicker adhesive layer 13 will provide a higher adhesion between the interlayer 11 and the glass sheets 10. At the upper end of that range, the copolymers noted above will provide sufficient adhesion between the support layer 12 and the glass sheets 10. Some of those copolymers, however, have a refractive index which is different from the refractive index of the support layer 12. This difference in refractive index may be sufficiently large to cause visible reflections from the interface between the support and adhesive layers. These reflections result in optical distortion, especially since the support layer 12 is generally provided with an emboss pattern to facilitate de-airing during lamination.

Thus, from the standpoint of optical quality, forming the adhesive layers 13 as thin as possible is preferred. This is especially so if a silane is included in the adhesive layers 13. However, as the thickness of the adhesive layers 13 is reduced, adhesion levels to the glass will also decrease. Thus, the minimally tolerable thickness for retaining desirable adhesion may still lead to a problem with optical distortion if there is a significant difference in the refractive indices of the support layer 12 and the adhesive layers 13.

As a result, to provide the most advantageous combination of adhesion and optical quality, it is important to match as closely as possible the refractive index of the adhesive layers 13 to the refractive index of the support layer 12. The respective refractive indices should differ by no more than about 0.05, preferably by no more than about 0.04, more preferably by no more than about 0.03, and even further by no more than about 0.01. The thicker the adhesive layers 13 are formed, the more closely the refractive indices must be matched. To accomplish that, it is preferred to form the adhesive layers 13 from a copolymer including vinyl chloride. Thus, the adhesive layers 13 are preferably formed of a copolymer of vinyl chloride and a co-monomer capable of adhering to glass. A most preferred resin for forming the adhesive layers 13 is poly(vinyl chloride-co-vinyl acetate-co-maleic acid), such as VMCH commercially available from Union Carbide. The refractive index of the adhesive layers 13 may be adjusted by altering the additives included in the formulation. For example, since BBP has a higher refractive index than DHA, the refractive index of the adhesive layers 13 can be increased by using BBP as a plasticizer, reduced by using DHA as a plasticizer, or controlled by using a BBP/DHA mixture.

As mentioned above, the adhesive layers 13 may be applied to either the glass sheets 10 or the support layer 12. The adhesive layers 13 may be applied by any suitable technique. For instance, the adhesive layers 13 may be sprayed as latex to form a film on the support layer 12 or the glass sheets 10. Alternatively, the adhesive layer 13 formulation may be placed into solution and roll coated or rotogravure printed as a thin film on the support layer 12. The adhesive layers 13 may also be co-extruded in pelletized form with the support layer 12. Rotogravure printing is the preferred method of forming the adhesive layers 13.

EXAMPLES

The following examples are illustrative of the present invention and do not constitute any limitation with regard to the subject matter of the invention. The adhesion, optical quality, refractive index, and heat stability of each of the laminates in these examples were measured by the following methods.

1. Adhesion

The pummel test was used to measure interlayer adhesion to the glass. Twelve inch square glass laminates were placed in a $-18°$ C. refrigerator for at least two hours. After removal from the refrigerator, the laminates were placed on a metal substrate and hit repeatedly with a 16 oz. hammer to break the glass. All broken glass unadhered to the interlayer was then removed. The amount of glass left adhered to the interlayer was visually compared with a set of standards of known pummel scale and a pummel value for each sample was assigned, ranging from a pummel value of 0 (no adhesion; no glass adhered) to 10 (high adhesion, 100% of the glass adhered).

2. Optical Quality

The optical quality of laminated samples was determined by measurement of transmitted distortion using a float glass distortion meter, and by visual inspection using both a shadowgraph and a gridboard background. Transmitted haze was measured with a Hazegard XL200 from Gardner/BYK.

3. Refractive Index

Refractive index was measured using the Becke-Line method.

4. Heat Stability

Heat stability was determined by monitoring the yellowing rate of four inch square laminated samples in one or more temperature controlled ovens. After measuring the initial yellowness index (YIC) using the Spectrogard from Gardner/BYK of Silver Springs, Md., samples were placed in one of five ovens set at various temperatures (65°, 80°, 100°, 120° and 150° C.). The samples were removed from the ovens at regular intervals and the YIC was measured. The various time intervals were as follows: 500 hours for the oven at 65° C., 250 hours for the oven at 80° C., 48 hours for the oven at 100° C., 24 hours for the oven at .120° C., and 4 hours for the oven at 150° C.

5. Boil Test

Adhesion, YIC and Haze were also measured after the samples were subjected to a boil test. In the boil test, the samples were immersed, vertically on edge, in water at 66° C. for 3 minutes and then quickly transferred to and similarly immersed in boiling water. The samples were kept in the boiling water for 2 hours and then removed.

EXAMPLE 1

A support layer approximately 41 mils thick was made having the following formulation:

| Component | phr |
|---|---|
| SE1300 PVC Resin[1] | 90 |
| Geon E8[2] | 5 |
| CAPA 656[3] | 5 |
| Dihexyl adipate | 50 |
| BBP | 5 |
| Drapex 6.8[4] | 5 |
| Thermchek 130[5] | 3 |
| Irganox 1010[6] | 0.5 |
| CPL46[7] | 0.1 |
| Tinuvin 328[8] | 0.2 |

[1] PVC resin having a degree of polymerization of 1300 available from Shintech Inc. of Freeport, TX.
[2] Copolymer resin (94% vinyl chloride – 6% methyl acrylate monomer mixture) available from The Geon Company.
[3] Polycapralactone resin available from Solvay Interox.
[4] Epoxidized soybean oil available from Witco Corp. of Oakland, NJ.
[5] Barium/zinc stabilizer package available from Ferro Corp. of Walton Hills, OH.
[6] Hindered phenolic antioxidant available from Ciba-Geigy Corp. of Hawthorne, NY.
[7] Perchlorate stabilizer available from Asahi Denka Kogyo K.K. of Japan.
[8] Benzatriazole ultraviolet light stabilizer available from Ciba-Geigy Corp.

Adhesive layers were formed by applying a layer of a poly(ethylene-co-vinyl acetate-co-acrylic acid) latex to the above support layer. The interlayer was then dried for 15 minutes at 100° C. A 2% solution of an amino silane was applied to the glass sheets and laminates were assembled and autoclaved at 340° F. and 240 psi with a 25 minute hold time.

Clear laminates were obtained with the following results:

| Property | Value |
|---|---|
| Adhesion, initial (pummel) | 9 |
| Haze, initial | 1.0% |
| Refractive index | |
| Adhesive layers | approximately 1.47 |
| Support layer | approximately 1.53 |
| Optical quality | visible distortion from emboss on support layer |

EXAMPLE 2

A support layer approximately 35 mils thick was made having the following formulation:

| Component | phr |
|---|---|
| SE1300 PVC Resin | 70 |
| Geon E8 | 20 |
| CAPA 656 | 10 |
| Dihexyl adipate | 40 |
| Drapex 6.8 | 5 |
| Thermchek 130 | 3 |
| Irganox 1010 | 0.5 |
| CPL46 | 0.1 |
| Tinuvin 328 | 0.25 |

An adhesive layer was then applied to both surfaces of the support layer. These adhesive layers were applied by rotogravure printing on the support layer with a solution of the following formulation:

| Component | Weight % |
|---|---|
| VMCH[9] | 19.1% |
| Dihexyl adipate | 3.8% |
| Z6040[10] | 9.5% |
| Tinuvin P[11] | 0.57% |
| Thermchek 840[12] | 0.23% |
| MEK solvent[13] | 66.8% |

[9] Poly(vinyl chloride-co-vinyl acetate-co-maleic acid) having a number average molecular weight of 20,000, available from Union Carbide Corp.
[10] Gamma glycidoxypropyl trimethoxysilane available from Dow Corning.
[11] Benzatriazole ultraviolet light stabilizer available from Ciba-Geigy Corp.
[12] Tin stabilizer available from Ferro Corp.
[13] Methyl ethyl ketone.

After allowing the solvent to evaporate, the thickness of each of the adhesive layers was determined, by weighing, to be about 0.0001". Laminates were assembled with a pair of 12"×12" sheets of glass and the above described interlayer, and were autoclaved at 300° F. and 240 psi with a 25 minute hold time.

Clear laminates were obtained with the following results:

| Property | Value |
|---|---|
| Adhesion, initial (pummel) | 9 |
| Haze, initial | 0.5–0.8% |
| Initial YIC | 0.5 |
| Adhesion after boil test | no change |
| Haze after boil test | no change |
| YIC after boil test | no change |
| Refractive Index | |
| Adhesive layers | 1.521 ± .001 |
| Support layer | 1.546 ± .003 |
| Heat stability* | 5.6 |
| Optical quality | no visible distortion |

*YIC after 500 hours at 100° C. For comparison, samples with the identical support layer but without any adhesive layer were laminated under the identical autoclave cycle after wiping a 4% gamma mercaptopropyl triethoxysilane solution on the each glass sheet. For these samples, the YIC after 500 hours at 100° C. was determined to be 6.4.

EXAMPLE 3

Laminates were made which were identical to those made in example 2, except that the adhesive layers included 3.8% by weight BBP instead of 3.8% by weight DHA. The refractive indices were measured as followed:

| | Refractive index |
|---|---|
| Support layer | 1.546 ± .003 |
| Adhesive layer with DHA | 1.521 ± .001 |
| Adhesive layer with BBP | 1.535 ± .001 |

EXAMPLE 4

A support layer approximately 35 mils thick was made having the following formulation:

| Component | phr |
|---|---|
| SE1300 PVC Resin | 90 |
| Geon E8 | 5 |
| CAPA 656 | 5 |
| DHA | 42.5 |
| BBP | 5 |
| Drapex 6.8 | 5 |
| Thermchek 130 | 3 |
| Irganox 1010 | 0.5 |
| CPL46 | 0.1 |
| Tinuvin 328 | 0.2 |

This support layer was provided with an adhesive layer on both surfaces by rotogravure printing with each of the following formulations, which vary only as to the level of epoxy silane included:

| Component | #1 (Wt %) | #2 (Wt %) | #3 (Wt %) |
|---|---|---|---|
| VMCH | 19.1% | 19.1% | 19.1% |
| Dihexyl adipate | 3.8% | 3.8% | 3.8% |
| Z6040 | 9.5% | 5.0% | 1.0% |
| Tinuvin P | 0.57% | 0.57% | 0.57% |
| Thermchek 840 | 0.23% | 0.23% | 0.23% |
| MEK solvent | 66.8% | 66.8% | 66.8% |

After allowing the solvent to evaporate, the thickness of each of the adhesive layers was determined by weighing. Laminates were assembled with a pair of 12"×12" sheets of glass and the above described interlayer, and were autoclaved at 300° F. and 240 psi with a 25 minute hold time.

Clear laminates were obtained with the following results:

| | Wt. % Silane | Thickness | Adhesion (Pummel) |
|---|---|---|---|
| #1 | 9.5 | 0.088 mil | 9 |
| #2a | 5.0 | 0.073 mil | 9 |
| #2b | 5.0 | 0.051 mil | 2 |
| #3 | 1.0 | 0.074 mil | 1 |

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A laminated glazing unit, comprising sequentially:
   a first glass sheet:
   a first adhesive layer including a polymeric material, said adhesive layer having a first refractive index:
   a support layer including a plasticized vinyl chloride polymer having a number average molecular of at least about 30,000, said support layer having a second refractive index and a total plasticizer concentration of between about 20 phr to about 60 phr;
   a second adhesive layer including a polymeric material: and
   a second glass sheet;
   wherein said first and said second refractive indices differ by no more than about 0.05.

2. A laminated glazing unit as defined in claim 1, wherein said first and said second refractive indices differ by no more than about 0.04.

3. A laminated glazing unit as defined in claim 1, wherein said first and said second refractive indices differ by no more than about 0.03.

4. A laminated glazing unit as defined in claim 1, wherein said first and said second refractive indices differ by no more than about 0.01.

5. A laminated glazing unit as defined in claim 1, wherein said second adhesive layer has a refractive index which differs from said second refractive index by no more than about 0.05.

6. A laminated glazing unit as defined in claim 1, wherein said first adhesive layer includes a vinyl chloride polymer.

7. A laminated glazing unit as defined in claim 6, wherein said first adhesive layer includes a copolymer of vinyl chloride and a comonomer having acid functional groups.

8. A laminated glazing unit as defined in claim 6, wherein said first adhesive layer includes a copolymer of vinyl chloride, vinyl acetate, and maleic acid.

9. A laminated glazing unit as defined in claim 6, wherein said first adhesive layer includes a copolymer of vinyl chloride, vinyl acetate, and vinyl alcohol.

10. A laminated glazing unit as defined in claim 1, wherein said support layer includes a copolymer of vinyl chloride and methyl acrylate.

11. A laminated glazing unit as defined in claim 1, wherein said support layer includes a copolymer of vinyl chloride and ethylene.

12. A laminated glazing unit as defined in claim 1, wherein said first and second adhesive layers include a silane.

13. A laminated glazing unit as defined in claim 12, wherein said silane is an epoxy silane.

14. A laminated glazing unit as defined in claim 11, wherein said silane is an amino silane.

15. A laminated glazing unit as defined in claim 11, wherein said silane is a mercapto silane.

16. A laminated glazing unit as defined in claim 1, wherein said adhesive layers are not more than about 0.5 mils thick, and said support layer is at least about 10 mils thick.

17. A laminated glazing unit as defined in claim 16, wherein said support layer is at least about 25 mils thick.

18. A laminated glazing unit, comprising sequentially:
   a first glass sheet;
   a first adhesive layer including a polymeric material which is thermodynamically compatible with a vinyl chloride polymer, said polymeric material including at least one functional group which is capable of forming chemical bonds with glass;
   a support layer including a vinyl chloride polymer, with the level of vinyl chloride being above 50% by weight of the total monomer mix;
   a first adhesive layer including a polymeric material which is themodynamically compatible with said vinyl chloride polymer, said polymeric material including at least one type of functional group which is capable of forming chemical bonds with glass; and
   a second glass sheet.

19. A laminated glazing unit as defined in claim 18, wherein said adhesive layer includes a vinyl chloride polymer.

20. A laminated glazing unit as defined in claim 19, wherein said first adhesive layer includes a copolymer of vinyl chloride and a comonomer having acid functional groups.

21. A laminated glazing unit as defined in claim 19, wherein said first adhesive layer includes a copolymer of vinyl chloride, vinyl acetate, and maleic acid.

22. A laminated glazing unit as defined in claim 19, wherein said first adhesive layer includes a copolymer of vinyl chloride, vinyl acetate, and vinyl alcohol.

23. A laminated glazing unit as defined in claim 18 wherein said support layer includes a copolymer of vinyl chloride and ethylene.

24. A laminated glazing unit as defined in claim 18, wherein said support layer includes a copolymer of vinyl chloride and methyl acrylate.

25. A laminated glazing unit as defined in claim 18, wherein said first and second adhesive layers include a silane.

26. A laminated glazing unit as defined in claim 25, wherein said silane is an epoxy silane.

27. A laminated glazing unit as defined in claim 25, wherein said silane is an amino silane.

28. A laminated glazing unit as defined in claim 25, wherein said silane is a mercapto silane.

29. A laminated glazing unit as defined in claim 18, wherein said adhesive layers are not more than about 0.5 mils thick, and said support layer is at least about 10 mils thick.

30. A laminated glazing unit as defined in claim 29, wherein said support layer is at least about 25 mils thick.

* * * * *

UNITED STATES PATENT AND TRADEMARK OFFICE
CERTIFICATE OF CORRECTION

PATENT NO. : 5,593,786
DATED : JANUARY 14, 1997
INVENTOR(S) : PARKER ET AL.

It is certified that error appears in the above-identified patent and that said Letters Patent is hereby corrected as shown below:

COLUMN 1, LINE 10 DELETE "to".

COLUMN 5, LINE 15, CHANGE "20 about" TO —20 to about—.
COLUMN 8, LINE 13, CHANGE "De" to —be—.

CLAIM 18, LINE 3, CHANGE "a first" TO —an—.
CLAIM 18, LINE 4, CHANGE "a" TO —said—.
CLAIM 18, LINE 11, CHANGE "a first" to —an—.

Signed and Sealed this

Sixteenth Day of February, 1999

Attest:

Attesting Officer

Acting Commissioner of Patents and Trademarks